(12) United States Patent
Tomioka

(10) Patent No.: US 6,735,044 B2
(45) Date of Patent: May 11, 2004

(54) MAGNETIC DISK APPARATUS WITH HUMIDITY CONTROLLER

(75) Inventor: Yuki Tomioka, Sayama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 324 days.

(21) Appl. No.: 09/954,169

(22) Filed: Sep. 18, 2001

(65) Prior Publication Data

US 2002/0034040 A1 Mar. 21, 2002

(30) Foreign Application Priority Data

Sep. 21, 2000 (JP) ........................................ 2000-287719

(51) Int. Cl.$^7$ ............................................... G11B 33/14
(52) U.S. Cl. ........................................................ 360/97.02
(58) Field of Search ....................................... 360/97.02

(56) References Cited

U.S. PATENT DOCUMENTS 4,620,248 A * 10/1986 Gitzendanner ........... 360/97.02
5,012,360 A    4/1991 Yamauchi et al.

FOREIGN PATENT DOCUMENTS

| EP | 0 295 054 | 12/1998 |
| JP | 3-91186 | 4/1991 |
| JP | 3-252985 | 11/1991 |
| JP | 6-34348 | 5/1994 |

OTHER PUBLICATIONS

Publication No. JP 07254268A, Patent Abstracts of Japan, Oct. 1995.

* cited by examiner

*Primary Examiner*—George J. Letscher
(74) *Attorney, Agent, or Firm*—Pillsbury Winthrop LLP

(57) ABSTRACT

A humidity controller arranged within a casing of an HDD includes a container housing a moisture absorbing agent, an air communication port that permits communication between the inner space of the casing and the inner space of the container, and an opening-closing control section configured to open-close the air communication port in accordance with the humidity inside the casing. The opening-closing control section is arranged in the container and includes a humidity sensitive member that is elongated or shrunk in accordance with the humidity to open-close the air communication port.

3 Claims, 4 Drawing Sheets

MAGNETIC DISK APPARATUS WITH HUMIDITY CONTROLLER

CROSS-REFERENCE TO RELATED APPLICATIONS

This application is based upon and claims the benefit of priority from the prior Japanese Patent Application No. 2000-287719, filed Sep. 21, 2000, the entire contents of which are incorporated herein by reference.

BACKGROUND OF THE INVENTION

1. Field of the Invention

The present invention relates to a magnetic disk apparatus, particularly, to a magnetic disk apparatus equipped with a humidity controller for controlling the humidity within a casing.

2. Description of the Related Art

In general, a magnetic disk apparatus, e.g., a hard disk drive (hereinafter referred to as "HDD"), comprises, for example, a magnetic disk, a spindle motor for rotating the magnetic disk, a magnetic head for writing/reading data in and from the magnetic disk, a head suspension assembly for supporting and moving the magnetic head, and a VCM for driving the head suspension assembly. These members of the magnetic disk apparatus are housed in a casing of a substantially hermetic structure. Where the casing is of a hermetic structure, the floating operation of the magnetic head relative to the magnetic disk can be stabilized in the writing/reading step. In addition, it is possible to prevent dust or the like from entering the casing.

Also, where the casing is of a substantially hermetic structure, the pressure inside the HDD is rendered different from the atmospheric pressure by the rapid change in the environmental temperature so as to bring about breakage of the casing. As a measure against the breakage of the casing, the casing is provided with fine holes allowing the atmosphere within the casing to communicate with the outer atmosphere. Also, air filters for preventing the dust from entering the casing from the outside are mounted on these fine holes.

On the other hand, where the casing is of a substantially hermetic structure, though fine holes are formed in the casing, a long time is required for replacing the air inside the HDD by the outer atmosphere, with the result that big influences are given to the change in the temperature and the change in the humidity of the HDD. To be more specific, the inner space of the HDD after operation for a long time under a high temperature state or under a high temperature and high humidity state comes to maintain a certain stable constant temperature. If the HDD is put in a normal environment, e.g., under the temperature of 25° C. and the humidity of 55%, the temperature inside the HDD is gradually changed to the temperature of the general environment. However, since the moisture inside the HDD does not escape to the outside of the HDD, the relative humidity inside the HDD is increased to reach 90% or more in accordance with the temperature drop. As a result, dew is formed on the magnetic disk and on the surface of the magnetic head. What should be noted is that impurities tend to be dissolved in the dew so as to be adsorbed on the magnetic head and the magnetic disk, with the result that the metal part tends to be corroded.

As a measure for preventing dew formation, Japanese Patent Disclosure (Kokai) No. 5-12848 discloses an HDD provided with a humidity control apparatus comprising a moisture absorbing agent and a heater. However, in the HDD disclosed in this prior art, the moisture absorbing agent is kept in contact with the air inside the HDD. As a result, it is impossible for the moisture absorbing agent to absorb the moisture efficiently when the atmosphere inside the HDD has the highest humidity. Further, since the HDD is provided with a heater, the entire apparatus tends to be rendered bulky. At the same time, the heater provides a heat source so as to give detrimental effects to the internal mechanism of the HDD.

It is also conceivable to allow the inner atmosphere of the HDD to communicate with the outer atmosphere only when the inner atmosphere has a high humidity. In this case, however, the air circulation within the HDD is not satisfactory because the HDD has a complex inner structure, resulting in failure to obtain a desired effect.

BRIEF SUMMARY OF THE INVENTION

An object of the present invention, which has been achieved in view of the situation described above, is to provide a magnetic disk apparatus, which prevents the formation of dew within the casing, so as to improve reliability.

According to an aspect of the present invention, there is provided a magnetic disk apparatus, comprising: a magnetic disk; a motor configured to support and rotate the magnetic disk; a magnetic head configured to write/read information to/from the magnetic disk; a casing of a substantially hermetic structure, which houses the magnetic disk, the motor and the magnetic head; and a humidity controller arranged within the casing and configured to control the humidity within the casing; the humidity controller including a container containing a moisture absorbing agent, an air communication port that permits communication between the inner space of the casing and the inner space of the container, and an opening-closing control section for opening-closing the air communication port in accordance with the humidity within the casing; and the opening-closing control section being arranged in the container and including a humidity sensitive member that is elongated or shrunk in accordance with the humidity to open-close the air communication port.

According to another aspect of the present invention, there is provided a magnetic disk apparatus, comprising a magnetic disk; a motor configured to support and rotate the magnetic disk; a magnetic head configured to write/read information to/from the magnetic disk; a casing of a substantially hermetic structure, which houses the magnetic disk, the motor and the magnetic head; and a humidity controller arranged within the casing and configured to absorb the moisture within the casing when humidity within the casing has exceeded a predetermined upper limit and for releasing the absorbed moisture into the casing atmosphere when the humidity within the casing has been lowered to a value smaller than a predetermined lower limit.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate the embodiments of the present invention, and together with the general description given above and the detailed description of the embodiments given below, serve to explain the principles of the present invention.

DETAILED DESCRIPTION OF THE INVENTION

Some embodiments of the magnetic disk apparatus of the present invention, which is applied to an HDD, will now be described in detail with reference to the accompanying drawings.

Figure 1:
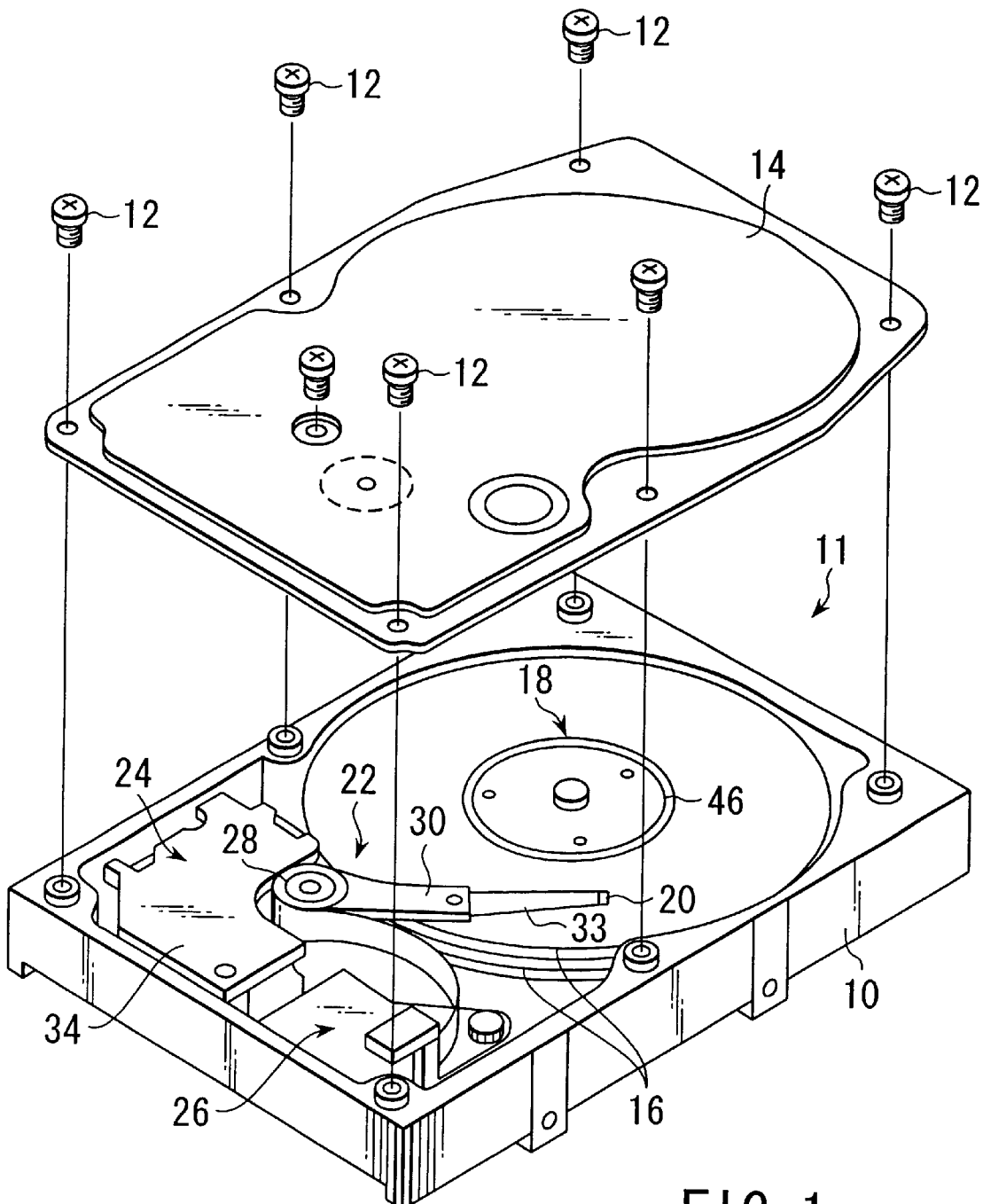
FIG. 1 is an oblique view showing in a dismantled fashion an HDD according to one embodiment of the present invention.

As shown in FIG. 1, an HDD comprises a casing 11 of a substantially hermetic structure including a case body 10 and a top cover 14. The case body 10 is in the form of a rectangular box having an open upper surface, and the top cover 14 is fixed to the case body 10 by a plurality of screws 12 so as to close the upper open surface of the case body 10.

Housed in the case body 10 are, for example, two magnetic disks 16 acting as magnetic recording media, a spindle motor 18 supporting and rotating these magnetic disks 16, magnetic heads 20 for writing/reading data in and from the magnetic disks 16, a carriage assembly 22 for supporting these magnetic heads 20, a voice coil motor 24 for rotating and determining the position of the carriage assembly 22, and a substrate unit 26 having, for example, a preamplifier. Also, a printed circuit substrate (not shown) for controlling the operation of the spindle motor 18, the voice coil motor 24 and the magnetic head 20 is screwed to the outer surface on the bottom wall of the case body 10.

The carriage assembly 22 includes a substantially cylindrical bearing assembly 28 fixed to the bottom wall of the case body 10 and four sets of head suspension assemblies rotatably supported by the bearing assembly. Each of the head suspension assemblies includes an arm 30 extending from the bearing assembly 28 toward the magnetic disks 16 and a slender suspension 33 fixed to the tip of the arm 30. The magnetic head 20 is mounted to the tip of the slender suspension 33.

The four sets of the head suspension assemblies are arranged such that two magnetic heads 20 are positioned to face each other with the magnetic disk 16 interposed therebetween. It follows that, if the carriage assembly 22 is rotated about the bearing assembly 28, each magnetic head 20 is movable to an optional track of the corresponding magnetic disk 16.

The voice coil motor (VCM) 24 includes a pair of yokes 34 fixed to the bottom wall of the case body 10, a permanent magnet (not shown) fixed to the inner surface of one of these yokes 34, and a voice coil (not shown) movable between one yoke fixed to the carriage assembly 22 and the permanent magnet. If an electric power is supplied to the voice coil, a magnetic field is generated, with the result that the carriage assembly is rotated by the interaction between the magnetic field generated from the voice coil and the magnetic field generated from the permanent magnet.

Figure 2:
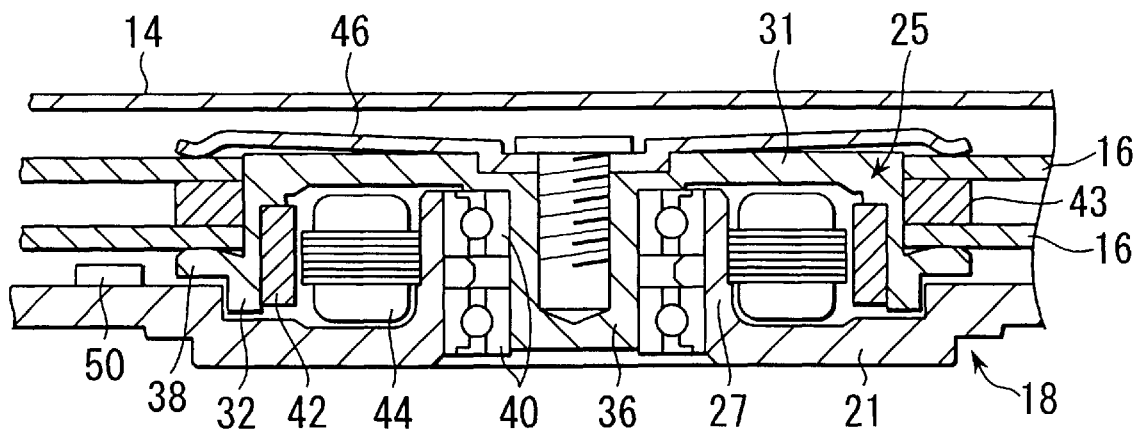
FIG. 2 is a cross sectional view showing the spindle motor portion of the HDD shown in FIG. 1.

As shown in FIG. 2, the spindle motor 18 includes a bracket 21 fixed to the bottom wall of the case body 10 and performing the function of a base portion, and a hub 25 rotatably supported by the bracket 21 so as to perform the function of a rotor. A cylindrical supporting sleeve 27 is integrally mounted to the central portion of the bracket 21.

The hub 25 includes a cylindrical main body 32, an upper wall 31 closing the upper edge of the main body 32, and a pivot 36 protruding from the center of the upper wall 31 into the inside of the main body 32, which are formed integral. Further, an annular flange 38 is formed in the outer circumferential surface in the lower edge portion of the main body 32.

The hub 25 is arranged such that the main body 32 is positioned coaxial with the outside of the supporting sleeve 27 and the pivot 36 is coaxially inserted into the supporting sleeve 27. Also, a pair of ball bearings 40 are arranged between the pivot 36 and the supporting sleeve 27. It follows that the hub 25 is supported rotatable relative to the supporting sleeve 27 by the pair of ball bearings 40.

An annular permanent magnet 42 is coaxially fixed to the inner circumferential surface of the hub main body 32. Also, a stator 44 having a core and a coil is mounted to the outer circumferential surface of the supporting sleeve 27 so as to be positioned adjacent to and to face the permanent magnet 42. If an electric power is supplied to the coil of the stator 44, a driving torque is generated so as to rotate the hub 25.

The two magnetic disks 16 are mounted coaxial with each other on the outer circumferential surface of the hub 25 of the spindle motor 18 and are stacked one upon the other in the axial direction of the hub 25. A spacer ring 43 engaged with the hub 25 is interposed between the two adjacent magnetic disks 16. The magnetic disks 16 and the spacer ring 43 are held between a disk-like clamper 46 screwed to the upper wall 31 of the hub 25 and the flange 38 and fixed to the outer circumferential surface of the hub main body 32. The magnetic disks 16 are rotated at a predetermined speed by the spindle motor 18.

On the other hand, a humidity controller 50 for controlling the humidity within the casing 11 is mounted to the bottom wall of the case body 12 of the casing 11 and positioned close to the spindle motor 18 and the magnetic disks 16, as shown in FIG. 2.

Figure 3:
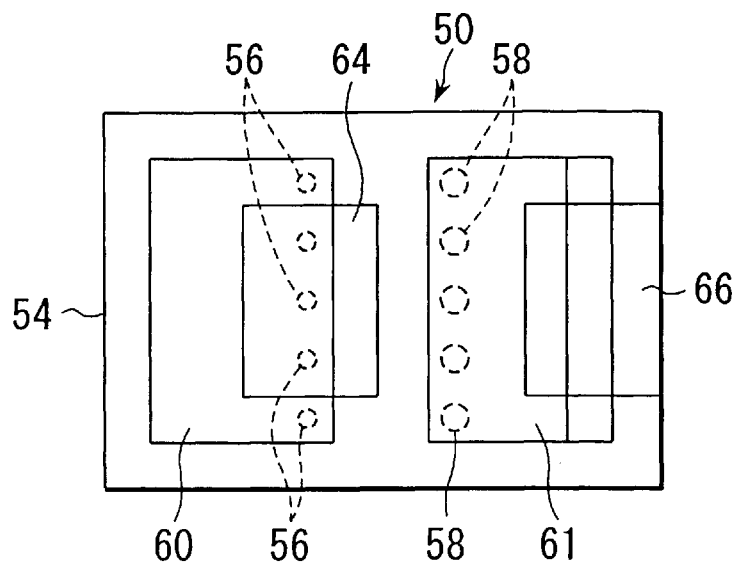
FIG. 3 is a plan view showing a humidity controller arranged in a casing of the HDD shown in FIG. 1.
Figure 4:
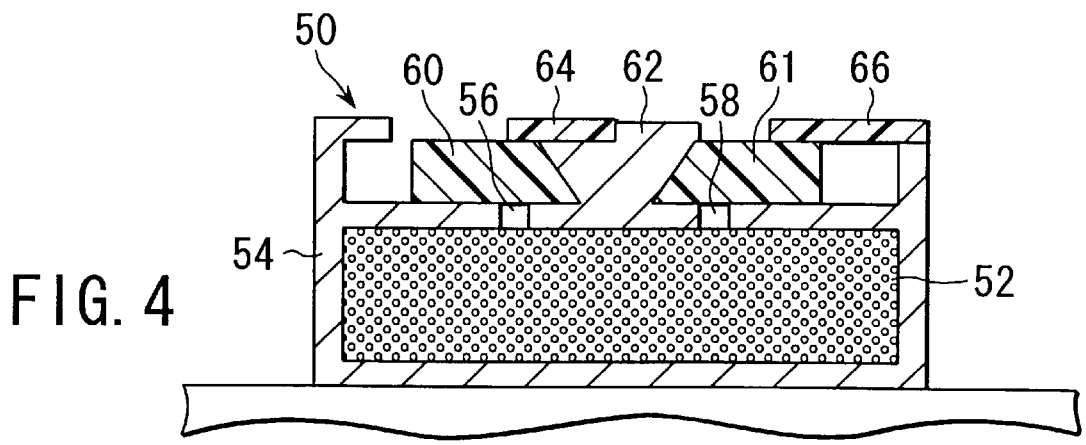
FIG. 4 is a cross sectional view showing the humidity controller shown in FIG. 3 under the state that a first lid body and a second lid body are closed.
Figure 5:
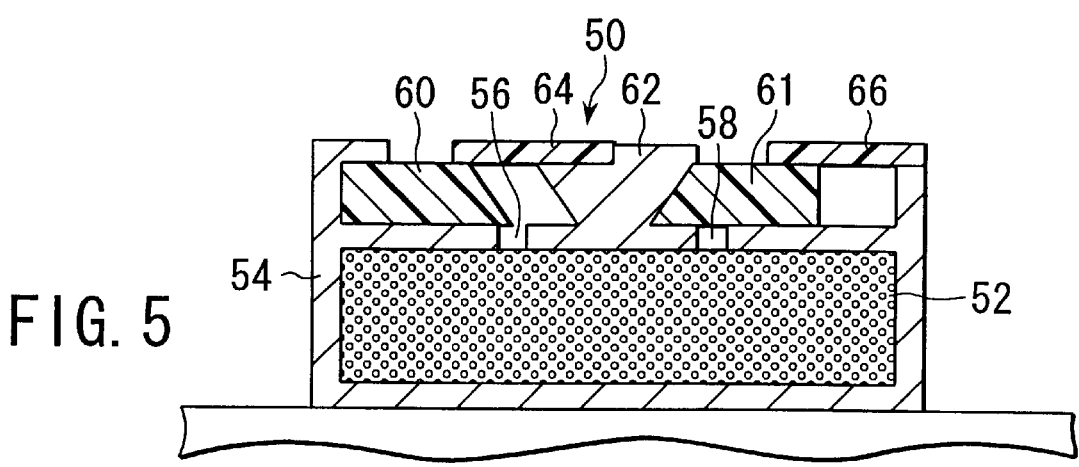
FIG. 5 is a cross sectional view showing the humidity controller shown in FIG. 3 under the state that the first lid body is opened.

As shown in FIGS. 3 and 4, the humidity controller 50 includes a substantially rectangular box-shaped container 54 housing a moisture absorbing agent 52 such as a silica gel. A plurality of first air communication ports 56 that are arranged linearly and a plurality of second air communication ports 58 that are arranged linearly and substantially parallel to the first air communication ports 56 are formed through the upper wall of the container 54. The atmosphere within the container 54 is allowed to communicate with the atmosphere within the casing 11 through these first and second air communication ports 56 and 58.

Incidentally, the silica gel housed in the container 54 is capable of absorbing about 10% of the moisture. Therefore, where the inner volume of the casing 11 is, for example, 15 cm$^3$, it is necessary to absorb 18 mg of moisture in order to lower the humidity within the casing 11 from 100% to 50%. It follows that about 180 mg of silica gel is required for lowering the humidity within the casing 11 from 100% to 50%.

Substantially rectangular first and second lid bodies 60 and 61 are arranged on the upper wall of the container 54. The first lid body 60 is slidable between the closing position shown in the drawing for closing the first air communication ports 56 and an open position for opening the first air communication ports 56. Also, the second lid body 61 is slidable between the closing position shown in the drawing for closing the second air communication ports 58 and an open position for opening the second communication ports 58.

The edge portions of the first and second lid bodies 60 and 61, which are positioned on the side of the central portion of the container 54, are wedge-shaped. Also, a protruding portion 62 is formed in the central portion of the upper wall of the container 54, and a recess conforming with the wedge-shaped edge portions of the lid bodies is formed in the protruding portion 62. As shown in FIG. 4, under the state that the first lid body 60 is moved to the closing position, the wedge-shaped edge portion is engaged with the recess of the protruding portion 62, with the result that the entire first lid body 60 is pushed against the upper wall of the container 54 so as to hermetically close the first air communication ports 56. Likewise, under the state that the second lid body 61 is moved to the closing position, the wedge-shaped edge portion is engaged with the recess of the protruding portion 62, with the result that the entire second lid body 61 is pushed against the upper wall of the container 54 so as to hermetically close the second air communication ports 58.

The humidity controller 50 comprises first and second opening-closing control members 64 and 66 serving to open-close the first and second lid bodies 60 and 61, respectively, in accordance with the humidity. These first and second opening-closing control members 64 and 66, which perform the function of a humidity sensitive member, are made of a humidity sensitive material having a large hygroscopic expansion coefficient and formed into a substantially rectangular sheet. These members 64 and 66 are elongated or shrunk depending on the humidity. The first opening-closing control member 64 is fixed at one end to the first lid body 60 and to the protruding portion 62 of the container 54 at the other end. Likewise, one end portion of the second opening-closing control member 66 is fixed to the second lid body 61 and the other end portion is fixed to the edge portion of the upper wall of the container 54.

It is desirable for the first and second opening-closing control members 64 and 66 to be formed of a film of, for example, polyamide (nylon 6, nylon 66), phenolic resin, urea resin, melamine resin, soft polyvinyl chloride, polyimide, polyacetal, polyether sulfone, casein resin, or acetyl cellutase having a thickness of 5 to 650 $\mu$m and a hygroscopic expansion coefficient of $0.1 \times 10^{-6}$ to $50 \times 10^{-6}$ cm/cm/%RH. The thickness of each of the opening-closing members 64, 66 is determined by the hygroscopic expansion coefficient of the material of each of these opening-closing members 64, 66.

Where the humidity within the casing 11 falls within a range of between a predetermined upper limit, e.g., 95%, and a predetermined lower limit, e.g., 60%, in the HDD equipped with the humidity controller 50 of the construction described above, each of the first and second lid bodies 60, 61 is held in its closing position as shown in FIG. 4 so as to shield the inner space of the container 54 from the inner space of the casing 11.

On the other hand, where the humidity within the casing 11 has been increased to exceed the predetermined upper limit, the first opening-closing control member 64 absorbs moisture so as to be expanded, with the result that the first lid body 60 is moved from its closing position to the opening position. As a result, the first air communication ports 56 are opened so as to permit the atmosphere within the casing 11 to communicate with the humidity absorbing agent 52 housed in the container 54. It follows that the moisture within the casing 11 is absorbed by the humidity absorbing agent 52. In this fashion, a rapid increase in the humidity within the casing 11 is prevented so as to maintain the humidity at a level lower than the predetermined upper limit, thereby preventing dew formation within the casing 11.

If the humidity within the casing 11 is made lower than the predetermined upper limit, the first opening-closing control member 64 is shrunk so as to permit the first lid body 60 to be moved again to its closing position, thereby closing the first air communication ports 56. Incidentally, the second opening-closing control member 66 also absorbs moisture so as to be expanded when the humidity within the casing 11 is increased. In this case, however, the second lid body 61 abuts against the protruding portion 62 so as to be held at its closing position.

Figure 6:
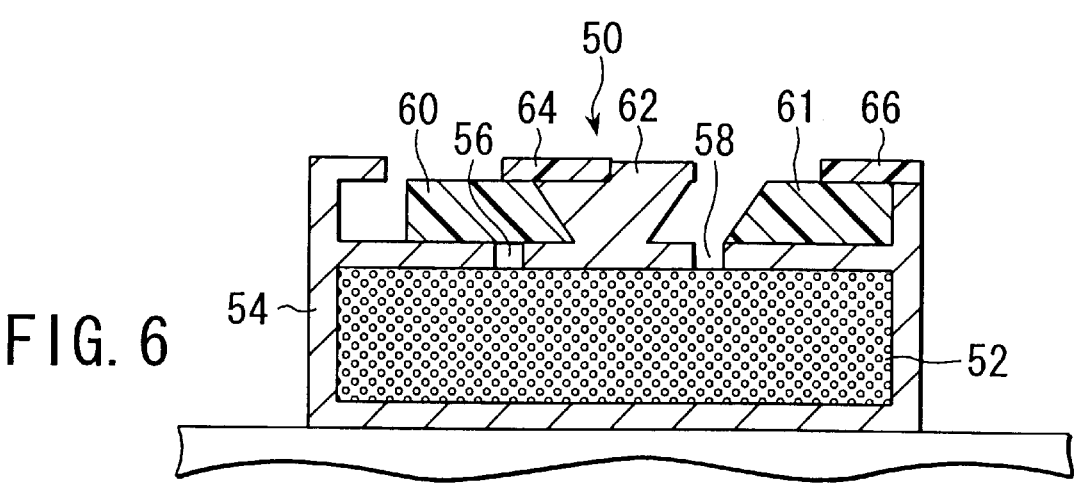
FIG. 6 is a cross sectional view showing the humidity controller shown in FIG. 3 under the state that the second lid body is opened.

On the other hand, where the humidity within the casing 11 has been lowered to a level lower than the predetermined lower limit, the second opening-closing control member 66 is dried so as to be shrunk, as shown in FIG. 6. As a result, the second lid body 61 is moved from its open position to its closing position by the second opening-closing control member 66 so as to open the second air communication ports 58, with the result that the atmosphere within the casing 11 is allowed to communicate with the moisture absorbing agent 52. It follows that the moisture absorbed by the moisture absorbing agent 52 housed in the container 54 is moderately released through the second air communication ports 58 into the casing 11. As a result, the humidity within the casing 11 is maintained at a level not lower than the predetermined lower limit so as to prevent static electricity from being generated within the casing 11 and to regenerate the moisture absorbing agent 52.

If the humidity within the casing 11 is increased to a level higher than the predetermined lower limit, the second opening-closing control member 66 is expanded so as to move again the second lid body 61 to the closing position so as to close the second air communication port 58. Incidentally, the first opening-closing control member 64 is dried by the decrease in the humidity. In this case, however, the first lid body 60 abuts against the protruding portion 62 of the container 54 so as to be retained in its closing position.

In the humidity controller 50 of the construction described above, the upper limit and the lower limit of the humidity for allowing the first and second opening-closing control members 64 and 66 to open or close the first and second lid bodies 60 and 61 can be controlled by adjusting the humidity sensitive material used for forming the opening-closing control member, the length, thickness, etc. of the opening-closing control member, and the forming positions of the first and second air communication ports 56, 58.

To be more specific, the expansion amount and the shrinking amount of the opening-closing control member corresponding to the change in the humidity are substantially determined by the humidity sensitive material used for forming the opening-closing control member as well as the length, thickness, etc. of the opening-closing control member. For example, when it comes to an opening-closing control member made of nylon 6 and sized at 10 mm, the control member is expanded by about 2 mm under the humidity of 98% and is shrunk by about 1 mm under the humidity of about 40%. It follows that it is possible to set optionally the humidity at which the lid body is opened or closed by adjusting the humidity sensitive material used for forming the opening-closing control member, the size of the opening-closing control member and the position of the air communication port.

Figure 7:
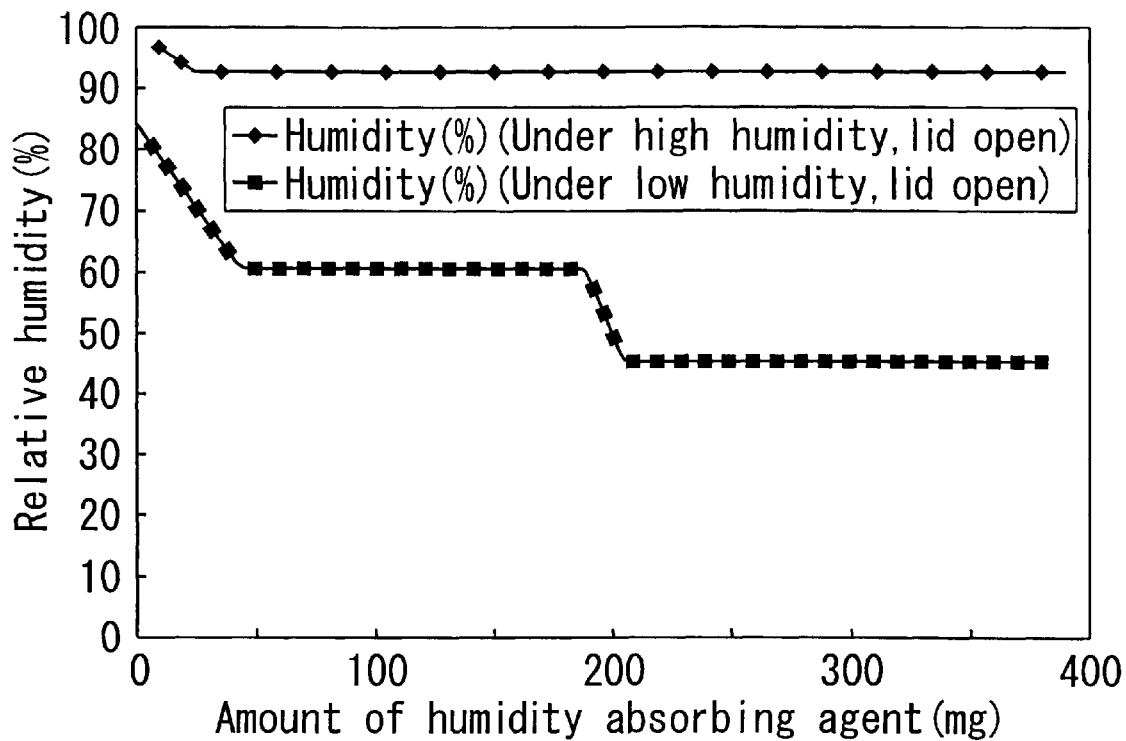
FIG. 7 is a graph showing the relationship between the amount of the moisture absorbing agent housed in the humidity controller and the opening-closing humidity of the opening-closing control member.

It should also be noted that the upper limit and the lower limit of the humidity for opening-closing the first and second lid bodies 60, 61 are set at appropriate values depending on the environment under which the HDD is used or depending on the amount of the moisture absorbing agent 52 as shown in FIG. 7.

According to the HDD constructed as described above, the moisture within the casing 11 can be absorbed by the humidity controller 50 so as to prevent the dew formation within the casing even where the humidity within the casing 11 has been increased to a value not lower than the predetermined upper limit depending on the change in the environmental temperature. It follows that it is possible to prevent the impurities dissolved in the dew from being adsorbed on the magnetic disk 16 and on the magnetic head 20 and to prevent the metal parts from being corroded, making it possible to obtain an HDD having an improved reliability. It should also be noted that, where the humidity within the casing 11 has been lowered to a value not higher than the predetermined lower limit, the moisture absorbed by the moisture absorbing agent housed in the humidity controller 50 is released into the casing atmosphere so as to maintain the humidity within the casing at a level not lower than the predetermined lower limit. It follows that it is possible to prevent static electricity from being generated within the casing 11 and to regenerate the moisture absorbing agent.

What should also be noted is that the humidity controller 50 arranged in the HDD is constructed to open the first lid body 60 only when the humidity within the casing 11 has been increased to reach the predetermined upper limit at which dew is formed within the casing 11. It follows that, compared with the structure in which the moisture is kept absorbed, the humidity controller 50 of the present embodiment efficiently permits absorbance of the moisture when the atmosphere within the casing 11 has the highest humidity, making it possible to prevent dew formation without fail. Similarly, the humidity controller 50 is constructed to open the second lid body 61 only when the humidity within the casing 11 has been lowered to a value not higher than the predetermined lower limit so as to release the moisture absorbed by the moisture absorbing agent. It follows that the humidity within the casing 11 is not unduly lowered so as to maintain an appropriate humidity within the casing 11.

Also, since the humidity controller 50 is constructed to open or close the lid body by using an opening-closing control member formed of a humidity sensitive material having a large hygroscopic expansion coefficient, the mechanical driving mechanism for opening-closing the lid body is not required. It is also unnecessary to arrange a heater or the like for removing moisture from the moisture absorbing agent. It follows that the humidity controller 50 can be manufactured at a low cost and can be miniaturized. Also, since a humidity sensitive member that is elongated or shrunk in accordance with the humidity is used for opening/closing the air communication port, the construction of the humidity controller can be simplified so as to lower the manufacturing cost and to miniaturize the apparatus.

In the embodiment described above, the humidity controller 50 comprises a pair of air communication ports, a pair of the lid bodies and a pair of opening-closing control members and is constructed to perform both moisture absorbancy and moisture release. However, it is also possible for the humidity controller to comprise a single air communication port, a single lid body and a single opening-closing control member and to be constructed to perform only one of humidity absorbancy or humidity release.

Figure 8:
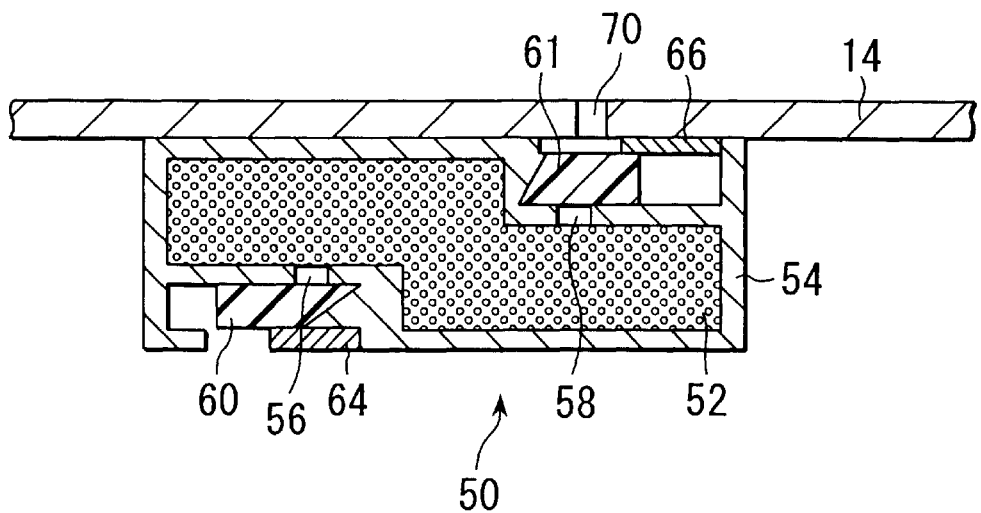
FIG. 8 is a cross sectional view showing a humidity controller of an HDD according to another embodiment of the present invention.

A humidity controller for an HDD according to another embodiment of the present invention will now be described. As shown in FIG. 8, according to the other embodiment of the present invention, the container 54 of the humidity controller 50 is fixed to the back surface of the top cover 14 of the HDD. Also, the first air communication port 56, the first lid body 60 and the first opening-closing control member 65 are mounted to the bottom wall of the container 54.

The second air communication port 58 is formed in the upper wall of the container 54, i.e., the wall adjacent to the top cover 14, so as to face an exhaust port 70 formed in the top cover 14. Also, the second lid body 61 for opening-closing the second air communication ports 58 and the second opening-closing control member 66 for opening-closing the second lid body 61 in accordance with the humidity are mounted to the upper wall of the container 54.

According to the embodiment of the particular construction described above, the first opening-closing control member 64 absorbs moisture so as to be expanded when the humidity within the casing of the HDD has been increased to a value not lower than the predetermined upper limit, thereby moving the first lid body 60 from the closing position to the open position. As a result, the first air communication port 56 is opened so as to allow the atmosphere within the casing 11 to communicate with the moisture absorbing agent 52, thereby allowing the moisture absorbing agent to absorb moisture within the casing 11. It follows that it is possible to prevent the humidity within the casing 11 from being rapidly increased, thereby maintaining the humidity within the casing 11 at a value not higher than the predetermined upper limit. It follows that dew formation within the casing 11 is prevented.

Further, if the humidity within the casing 11 is lowered to a level not higher than the predetermined upper limit, the first opening-closing control member 64 is shrunk so as to move again the first lid body 60 back to the closing position so as to close the first air communication port 56.

On the other hand, where the humidity outside the casing 11 is lowered to a level not higher than the predetermined lower limit, the second opening-closing control member 66 is dried so as to be shrunk. As a result, the second lid body 61 is moved by the second opening-closing control member 66 from the closing position to the open position so as to open the second air communication port 58, with the result that the outer atmosphere of the casing 11 is allowed to communicate with the moisture absorbing agent 52 through the second air communication port 58 and the exhaust port 70. It follows that the moisture absorbed by the moisture absorbing agent 52 is moderately released to the outside of the casing 11 through the second air communication port 58 and the exhaust port 70 so as to regenerate the moisture absorbing agent 52.

Further, when the humidity outside the casing 11 is increased to a level not lower than the predetermined lower limit, the second opening-closing control member 66 is expanded, with the result that the second lid body 61 is moved again back to the closing position so as to close the second air communication ports 58.

The rest of the construction of the embodiment shown in FIG. 8 is equal to that of the first embodiment described previously. Therefore, the same members of the apparatus are denoted by the same reference numerals so as to avoid an overlapping description. The embodiment shown in FIG. 8, which is constructed as described above, produces the function and effect similar to those produced by the first embodiment described previously.

Additional advantages and modifications will readily occur to those skilled in the art. Therefore, the present invention in its broader aspects is not limited to the specific details and representative embodiment shown and described herein. Accordingly, various modifications may be made without departing from the spirit or scope of the general inventive concept as defined by the appended claims and their equivalents. For example, the lid body of the humidity controller is not limited to the sliding type. It is also possible for the lid body to be of a rotary type or of a flap valve type. Also, in each of the embodiments described above, the lid body and the opening-closing control member are formed of different members. However, it is also possible to omit the lid body such that the air communication port is opened or closed by the opening-closing control member itself.

What is claimed is:

1. A magnetic disk apparatus, comprising:

a magnetic disk;

a motor configured to support and rotate the magnetic disk;

a magnetic head configured to write/read information to/from the magnetic disk;

a casing of a substantially hermetic structure, which houses the magnetic disk, the motor and the magnetic head; and a humidity controller arranged within the casing and configured to absorb the moisture within the casing when humidity within the casing has exceeded a predetermined upper limit and to release the absorbed moisture into the casing atmosphere when the humidity within the casing has been lowered to a value smaller than a predetermined lower limit;

the humidity controller including a container housing a moisture absorbing agent, first and second air communication ports communicating with the inner region of the casing and with the inner region of the container, respectively, a first opening-closing control section configured to open-close the first air communication port in accordance with the humidity within the casing so as to allow the moisture absorbing agent to absorb the moisture within the casing, and a second opening-closing control section configured to open-close the second air communication port in accordance with the humidity within the casing so as to release the moisture absorbed by the moisture absorbing agent into the casing atmosphere.

2. The magnetic disk apparatus according to claim 1, wherein the first and second opening-closing control sections are provided with humidity sensitive members mounted to the container and elongated or shrunk in accordance with the humidity so as to open or close the first and second air communication ports, respectively.

3. The magnetic disk apparatus according to claim 2, wherein:

the first opening-closing control section includes a first lid body movable between the closing position for closing the first air communication port and the open position for opening the first air communication port, and a first humidity sensitive member that is expanded when the humidity within the casing is increased to a level not lower than the predetermined upper limit so as to move the first lid body to the open position and is shrunk when the humidity within the casing is lowered to a level not higher than the predetermined upper limit so as to move the first lid body to the closing position, and the second opening-closing control section includes a second lid body movable between the closing position for closing the second air communication port and the open position for opening the second air communication port, and a second humidity sensitive member that is shrunk when the humidity within the casing is lowered to a level not higher than the predetermined lower limit so as to move the second lid body to the open position and is expanded when the humidity within the casing is increased to a level exceeding the predetermined lower limit so as to move the second lid body to the closing position.

* * * * *